Patented Aug. 15, 1933

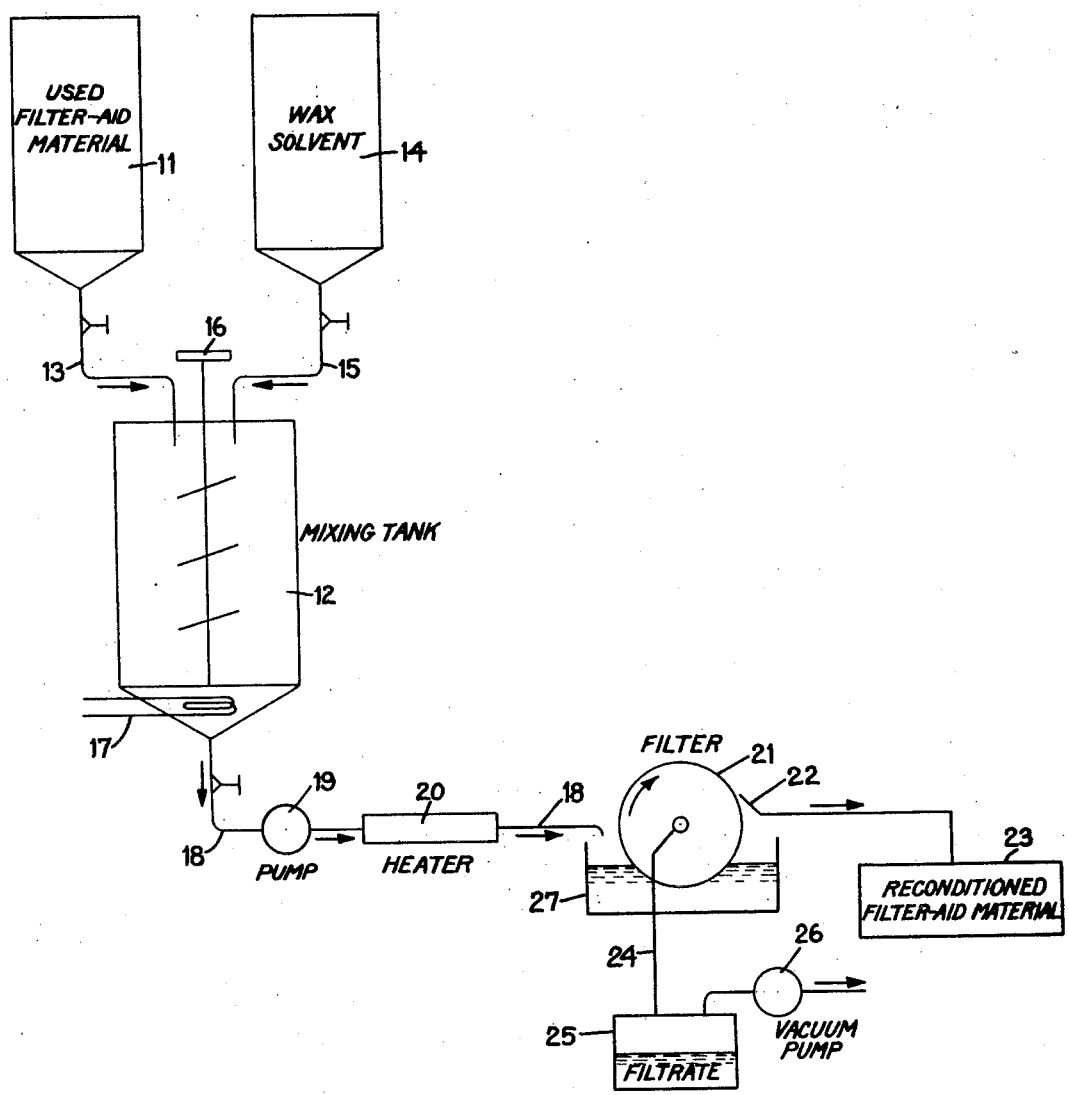

1,923,021

UNITED STATES PATENT OFFICE 1,923,021

METHOD OF RECONDITIONING FILTER-AID MATERIAL

William P. Gee, Plainfield, N. J., assignor to The Texas Company, New York, N. Y., a Corporation of Delaware Application September 26, 1930
Serial No. 484,698

1 Claim. (Cl. 252—2)

This invention relates to a method of reconditioning filter-aid material previously used in dewaxing hydrocarbon oil by filtration, in which the filter-aid material is recovered for further use in the dewaxing process under such conditions that the oil, wax and water normally associated with used filter-aid material are effectively separated and its filter-aid properties are restored.

The process of the invention contemplates a method of reconditioning filter-aid material in which the material is treated to remove oil, wax and water by mixing therewith a wax solvent and subjecting the mixture to filtration at elevated temperature whereby the reconditioned filter-aid material is separated in the form of a filter cake from the objectionable materials which pass through the filter. The filter-aid material thus recovered is so reconditioned that it may be reused in the dewaxing process.

In methods of dewaxing oil by filtering chilled oil in the presence of a filter-aid material, such for example as a process of the type disclosed in U. S. Letters Patent No. 1,509,325 to James W. Weir and William J. Ryan for process for lowering the cold test of lubricating oils, a filter cake consisting of the filter-aid material together with precipitated wax and a certain amount of soakage oil is formed. It has been found that, in the operation of the process, the filter-aid material will usually tend to pick up by adsorption a more or less quantity of water, which may come from the oil or from the atmosphere. The filter-aid material depends for its efficiency upon its ability to maintain an open, free filtering structure in the filter cake, and it has been found that the presence of even small quantities of water in the filter-aid material appreciably reduces the efficiency of the material. This effect of water is particularly pronounced in processes where the filtration of wax and filter-aid material from oil takes place at temperatures below the freezing point of water, and it is probable that the effected reduction of efficiency under these conditions is due to the formation of ice which tends to reduce the porosity of the filter-aid material.

The process of the present invention provides for the treatment of filter-aid material used in dewaxing processes whereby the material is not only effectively freed from wax and oil but also, in the same step, is freed from adsorbed water and is recovered in such condition that it may to recycled to the dewaxing process for reuse wherein it is substantially as effective as it was in its original conditions.

The invention may be readily under stood when considered in connection with the accompanying drawing which is a flow diagram indicating, diagrammatically, interconnected units of apparatus suitable for carrying on the various steps of the process.

Referring to the drawing, there is provided a storage tank 11 which contains filter-aid material previously used in the filtration of wax from hydrocarbon oil. This tank is connected to the mixing tank 12 by the line 13. The tank 14 is provided as a source of wax solvent, and this is also connected to the mixing tank 12 by the line 15.

The mixing tank 12 is fitted with suitable agitating means 16 and the coil 17 through which steam or other heating medium may be circulated to apply heat to the contents of the tank. A transfer line 18 leads from the mixing tank 12 to the pump 19, and thence through the heater 20 to the reservoir 27 of the filter 21, whereby the contents of the mixing tank 12 may be heated and conveyed to the filter.

Suitable means 22 is provided for discharging the filter cake, constituting reconditioned filter-aid material, from the filter 21 to the storage tank 23.

A filtrate line 24 leads from the filter 21 to the tank 25 which is provided for the accumulation of filtrate. A vacuum pump 26 is connected to the vapor space of the filtrate tank 25, whereby, through the line 24, a reduced pressure less than atmospheric may be maintained on the reverse side of the filtering surface of the filter 21.

The process of the invention may be operated in connection with the illustrated apparatus in the following manner:

The tank 11, a source of used filter-aid material, contains the filter cake derived from the dewaxing process which consists of wax, filter-aid material, and a certain amount of soakage oil. The filter-aid material used in filter-aid dewaxing processes of the type under consideration may consist of any suitable finely divided solid material and for the purpose of the present description may be assumed to be a suitably prepared diatomaceous earth. The filter-aid material in the tank 11 may contain water which has been picked up during the operation of the process to the extent of 1 to 20% by weight or even more. The contents of the tank 11 is introduced into the mixing tank 12 where it is mixed with a suitable wax solvent from the tank 14 in the desired proportions, which may be 25% by weight or a quantity suitable for forming a comparatively thick slurry. The wax solvent in the tank 14 may consist of a petroleum fraction of the approximate boiling range of kerosene or heavy naphtha, although other wax solvents may be used.

Heat may be applied to the contents of the mixing tank 12 to facilitate the solution of the wax and oil in the wax solvent. After thorough mixing in the tank 12, the resultant slurry is forced by the pump 19 to the reservoir 27 of the filter 21. The temperature desired in the slurry may be approximately 180 to 210° F. which may be obtained either by heating in the mixing tank 12, as described, or by applying heat to the slurry during its passage through the heater 20.

The filter 21 is preferably of the continuous vacuum type, such as the well-known Oliver or American continuous filters. In filters of this type, the filtering surface passes through a continuous cycle in which it is first submerged in the slurry contained in the reservoir 27 while vacuum is applied to the reverse side of the surface by means of the vacuum pump 26, whereby the filtrate is drawn through, leaving the solids deposited on the outer surface in the form of a filter cake. Thus, in the present process, a solution of wax and oil dissolved in the wax solvent is drawn through the filtering surface in the form of a filtrate, while the diatomaceous earth is deposited on the surface as a filter cake.

During the next step in the cycle of operation of the filter, the filtering surface emerges from the slurry contained in 27, but the vacuum on the reverse side is maintained whereby air is drawn through the filter cake, displacing the liquid contents of the cake to produce a cake of low moisture content. In accordance with the process of the invention, the filtering operation is carried on at a temperature of around 180° to 210° F. and it is found that the action of drawing air through the filter cake at this temperature substantially completely removes the adsorbed moisture in the filter-aid material, this being due probably to evaporation produced not only from the effect of air on moisture but also by the evaporation of the wax solvent from the cake.

It may be preferable to arrange the filter 21 so that an inert gas such as flue gas shall be drawn through the filter cake in order to prevent the formation of combustible mixtures of solvent vapor and air.

The filtrate, consisting of a solution of wax and oil in the wax solvent, is discharged from the filter 21 through the line 24, and is collected in the tank 25. The wax solvent may be evaporated from the contents of the tank 25 and reused in the process while the wax content may be recovered by suitable processing.

The water displaced from the filter cake during the filtering operation may collect to a certain extent in the filtrate tank or may remain in vapor form and pass out through the discharge line of the vacuum pump 26 to the atmosphere.

The filter cake consisting of reconditioned filter-aid material is discharged from the filter 21 by the discharge means 22, to the receptacle 23. The reconditioned filter-aid material thus obtained may be returned to the dewaxing process and reused, or in certain cases where it may contain adsorbed carbonaceous material the reconditioned filter-aid material may be subjected to burning or other additional treatment before being reused in the dewaxing process.

Obviously many modifications and variations of the invention, as herein set forth, may be made without departing from the spirit and scope thereof, and therefore, only such limitations should be imposed as are indicated in the appended claim.

What I claim is:

The process of recovering and reconditioning spent filter-aid material of the diatomaceous earth type previously used in the dewaxing of hydrocarbon lubricating oil by filtration at low temperature, said spent filter-aid material being associated with wax, oil and a comparatively small quantity of water, which comprises mixing the filter-aid and associated materials with a solvent of wax and oil such as a volatile fraction of petroleum, heating the mixture whereby a solution of wax and oil in the solvent is formed in which is suspended the filter-aid material and moisture adsorbed thereon, and then subjecting said suspension of filter-aid material to a continuous filtration operation at temperatures in excess of about 180° F. wherein a filter cake of filter-aid material is continuously built up on a filtering surface and a substantially moisture-free gas is continuously drawn through said cake while in position on the filtering surface and while at elevated temperature, whereby said spent filter-aid material is substantially freed from moisture and the solution of oil and wax, and reconditioned for further use in dewaxing oil.

WILLIAM P. GEE.